S. H. ROOD.
HERMETIC CLOSURE.
APPLICATION FILED MAR. 29, 1918.

1,300,224. Patented Apr. 8, 1919.

Witness:
C. H. Storrs

Inventor
Stanley H. Rood,
by Harry P. Williams
Attorney

UNITED STATES PATENT OFFICE.

STANLEY H. ROOD, OF HARTFORD, CONNECTICUT.

HERMETIC CLOSURE.

1,300,224.  Specification of Letters Patent.  Patented Apr. 8, 1919.

Application filed March 29, 1918. Serial No. 225,440.

*To all whom it may concern:*

Be it known that I, STANLEY H. ROOD, a citizen of the United States, residing at Hartford, in the county of Hartford and State of Connecticut, have invented a new and useful Improvement in Hermetic Closures, of which the following is a specification.

This invention relates to those closures which are by atmospheric pressure held sealed on the rims of jars and tumblers containing food products.

The object of the invention is to so construct the caps and gaskets of such closures that the gaskets will readily flow over and form secure seals about the rims of the receptacles when the closures are pressed to place for sealing after the air pressure in the interiors of the receptacles has been sufficiently reduced.

This object is attained by forming an annular groove in the inside near the edge of the cap of the closure and locating in this groove a packing gasket having a body of uncured plastic and somewhat adhesive compound containing rubber gum with an outer surface or skin that is vulcanized and thus rendered less adhesive than the interior body, whereby air can be readily withdrawn from the receptacle and when the desired degree of exhaustion is reached and the closure is pressed down the gasket will flow inside and outside of the rim of the receptacle with greater ease than if entirely vulcanized and form a substantial seal, and which when the seal is broken allows the closure to be removed without adhesion of the gasket to the rim of the receptacle.

Figure 1:
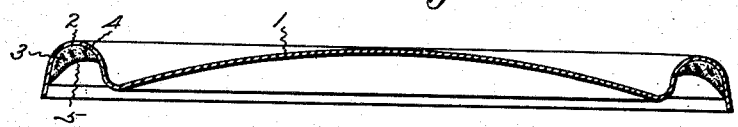
Figure 2:
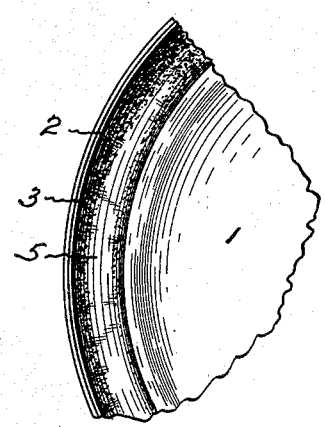
Figures 3, 4:
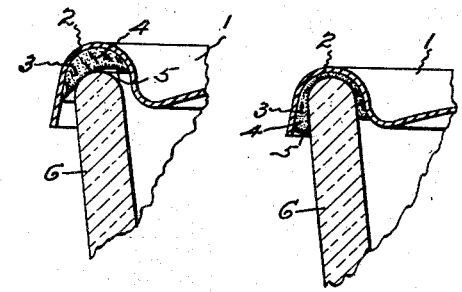
Figure 5:
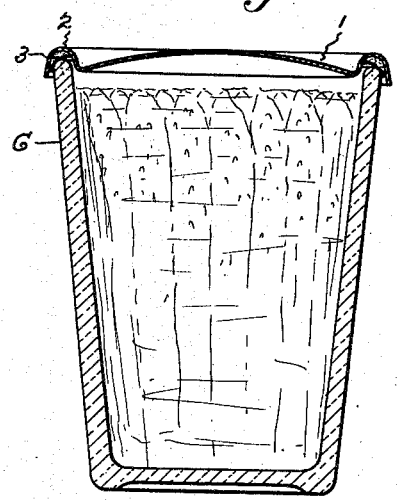
Figure 6:
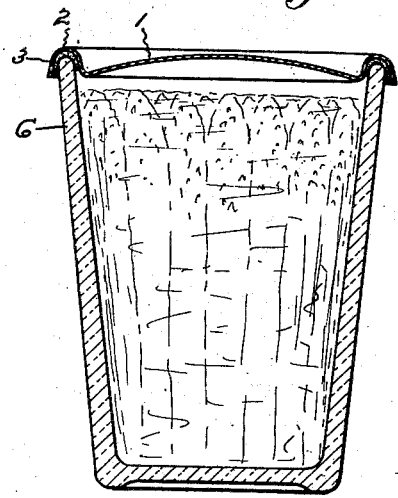

Figure 1 of the accompanying drawings shows a central section of a cap and gasket which embodies this invention. Fig. 2 is a view looking at the inside of a portion of the cap and gasket. Fig. 3 shows a section of the rim of a tumbler and a cap and gasket in unsealed position thereon. Fig. 4 is a similar view showing the cap and gasket in sealed position. Fig. 5 is a sectional view showing a closure in unsealed position on a tumbler. Fig. 6 is a like view showing a closure in sealed position on a tumbler.

The cap 1 of this closure may be formed of any suitable material, that shown being made of metal. This cap near its outer edge has an annular groove 2 that opens inwardly and in this groove is placed the packing gasket 3. This gasket is made with a body 4 formed of a compound containing uncured or partially cured rubber compound and it is left in this state so that it will be plastic and will adhere to the cap. The outer or exposed face 5 of the gasket is vulcanized so that it will be non-adhesive.

A preferred practice is to insert the uncured or partially cured gasket in the groove in the cap and then form or roll it to such shape that when the closure is laid upon the rim of a receptacle but a small area of the exposed surface of the gasket will rest upon the outer corner or edge of the rim of the receptacle 6. After the gasket has been thus located in the groove in the cap it is vulcanized on the outer or exposed surface by what is commonly known as the "cold cure" which forms a vulcanized skin on the exposed face only, leaving the inner portion of the gasket in its uncured or partially cured state.

When a closure with a gasket in this condition is placed on the rim of the receptacle but a small area of the gasket and rim of the receptacle are in contact, and as the outer surface of the gasket is vulcanized there will be no adhesion between the gasket and the rim of the receptacle, thus air can be easily withdrawn from the interior of the receptacle by the well known apparatus provided for this purpose. After the air has been sufficiently exhausted the closure is pressed down in the usual manner and this causes the plastic body of the gasket to readily flow and fill the space between the surface of the groove in the cap and the surface about the rim of the receptacle, the vulcanized skin sliding over the surface of the rim while the plastic portion of the interior of the gasket spreads around the rim and insures a sure sealing of the closure.

The invention claimed is:

1. A closure consisting of a cap having an inwardly opening annular groove near its outer edge, and an integral gasket located in said groove, said gasket being formed of gum and having a partially cured plastic body in contact with the wall of the groove and a vulcanized yielding exposed surface adapted to bear upon the rim of the receptacle to be closed.

2. A gasket for hermetically sealing a receptacle closure, having an adhesive and plastic body of partially cured gum and a vulcanized exposed surface.

STANLEY H. ROOD.